US012360291B2

(12) United States Patent
Ahn

(10) Patent No.: US 12,360,291 B2
(45) Date of Patent: Jul. 15, 2025

(54) WINDOW COVER FILM AND FLEXIBLE DISPLAY PANEL INCLUDING THE SAME

(71) Applicants: SK Innovation Co., Ltd., Seoul (KR); SK ie technology Co., Ltd., Seoul (KR)

(72) Inventor: Jong Nam Ahn, Daejeon (KR)

(73) Assignees: SK Innovation Co., Ltd., Seoul (KR); SK ie technology Co., Ltd., Seoul (KR)

( * ) Notice: Subject to any disclaimer, the term of this patent is extended or adjusted under 35 U.S.C. 154(b) by 733 days.

(21) Appl. No.: 17/388,446

(22) Filed: Jul. 29, 2021

(65) Prior Publication Data

US 2022/0043185 A1 Feb. 10, 2022

(30) Foreign Application Priority Data

Aug. 7, 2020 (KR) .................. 10-2020-0099435

(51) Int. Cl.
| | |
|---|---|
| *G02B 1/111* | (2015.01) |
| *C08G 73/10* | (2006.01) |
| *C08G 73/14* | (2006.01) |
| *C08K 3/36* | (2006.01) |
| *C08L 79/08* | (2006.01) |
| *G02B 1/11* | (2015.01) |
| *G02B 1/115* | (2015.01) |
| *G02B 1/14* | (2015.01) |
| *G02B 1/18* | (2015.01) |
| *G06F 1/16* | (2006.01) |
| *C08J 7/046* | (2020.01) |

(52) U.S. Cl.
CPC .......... *G02B 1/111* (2013.01); *C08G 73/1042* (2013.01); *C08G 73/14* (2013.01); *C08K 3/36* (2013.01); *C08L 79/08* (2013.01); *G02B 1/11* (2013.01); *G02B 1/115* (2013.01); *G02B 1/14* (2015.01); *G02B 1/18* (2015.01); *G06F 1/1652* (2013.01); *C08J 7/046* (2020.01); *C08J 2379/08* (2013.01)

(58) Field of Classification Search
CPC .. G02B 1/11; G02B 1/111; G02B 1/14; G02B 1/18; G02B 1/115; C08L 79/08; C08G 73/1042; C08G 73/14; C08J 7/046; G06F 1/1652; G09F 9/301
USPC ............................................ 428/1.1, 1.3, 1.6
See application file for complete search history.

(56) References Cited

U.S. PATENT DOCUMENTS

| | | | |
|---|---|---|---|
| 10,591,761 B2 | 3/2020 | Jee et al. | |
| 10,809,421 B2 | 10/2020 | Song et al. | |
| 2014/0338959 A1 | 11/2014 | Jung et al. | |
| 2016/0347930 A1* | 12/2016 | Okafuji | C08K 5/109 |
| 2018/0113350 A1* | 4/2018 | Jee | C08J 7/046 |
| 2020/0108588 A1 | 4/2020 | Jeon et al. | |
| 2020/0174161 A1 | 6/2020 | Ahn et al. | |

FOREIGN PATENT DOCUMENTS

| | | |
|---|---|---|
| JP | 2000347003 A | 12/2000 |
| JP | 201865387 A | 4/2018 |
| KR | 1020130074167 A | 7/2013 |
| KR | 1020180044216 A | 5/2018 |
| KR | 1020200040137 A | 4/2020 |
| KR | 1020200047125 A | 5/2020 |
| KR | 1020200066828 A | 6/2020 |
| KR | 1020200083272 A | 7/2020 |

* cited by examiner

*Primary Examiner* — Ruiyun Zhang
(74) *Attorney, Agent, or Firm* — The Webb Law Firm

(57) ABSTRACT

The present invention relates to a window cover film and a flexible display panel including the same. More particularly, the present invention relates to a window cover film including a base layer and a hard coating layer, and a flexible display panel including the same.

15 Claims, No Drawings

WINDOW COVER FILM AND FLEXIBLE DISPLAY PANEL INCLUDING THE SAME

CROSS-REFERENCE TO RELATED APPLICATION

This application claims priority to Korean Patent Application No. 10-2020-0099435 filed Aug. 7, 2020, the disclosure of which is hereby incorporated by reference in its entirety.

BACKGROUND OF THE INVENTION

Field of the Invention

The following disclosure relates to a window cover film and a flexible display panel including the same.

Description of Related Art

A thin type display device is implemented in a touch screen panel type, and has been used in various smart devices such as a smart phone, a tablet PC, and various wearable devices.

Such a touch screen panel-based display device is provided with a window cover formed of tempered glass on a display panel for protecting the display panel from a scratch or external impact.

However, since the tempered glass is not suitable for lightness and is vulnerable to external impact, an optical plastic film having flexibility and impact resistance and having a strength or scratch resistance corresponding to those of the tempered glass has been recently developed.

As a plastic material for such an optical plastic film, polyethylene terephthalate (PET), polyethersulfone (PES), polyethylene naphthalate (PEN), polyacrylate (PAR), polycarbonate (PC), polyimide (PI), polyaramid (PA), or the like is used, but plastic has a low hardness, lack of scratch resistance, and weak impact resistance as compared with the tempered glass. Therefore, various attempts have been made to form a hard coating layer on the plastic film in order to solve the above problems.

However, even in a case where the hard coating layer is formed, it is difficult to implement a high hardness corresponding to that of the tempered glass, a curl may occur due to shrinkage during curing, and flexibility is required for application to a flexible display panel requiring flexibility. Thus, there are still problems to be solved. In addition, recently, a high resolution has been required and the development of a film having an anti-reflection function has been demanded.

RELATED ART DOCUMENT

Patent Document (Patent Document 1) Korean Patent Laid-Open Publication No. 10-2013-0074167 (Jul. 4, 2013)

SUMMARY OF THE INVENTION

An embodiment of the present invention is directed to providing a window cover film which may implement a high resolution and have an anti-reflection function because it has a high transmittance and a low reflectivity.

Another embodiment of the present invention is directed to providing a window cover film having excellent mechanical properties, hardness, scratch resistance, and curl suppression property.

Still another embodiment of the present invention is directed to providing a window cover film that prevents occurrence of cracks even when being repeatedly bent and has excellent mechanical properties, abrasion resistance, antifouling property, and curl suppression property.

In one general aspect, a window cover film includes a hard coating layer, a base layer, and a low-refractive layer that are sequentially stacked, the base layer being formed of a polyamideimide-based resin, wherein a refractive index of the low-refractive layer is less than 1.4, and a refractive index relationship satisfies the following Expression 1, Refractive index of base layer>refractive index of hard coating layer>refractive index of low-refractive layer. [Expression 1]

A refractive index difference $\Delta n_1$ between the base layer and the low-refractive layer may satisfy the following Expression 2, $0.15 \leq \Delta n_1 \leq 0.4$. [Expression 2]

A refractive index difference $\Delta n_2$ between the base layer and the hard coating layer may satisfy the following Expression 3, $0.01 \leq \Delta n_2 \leq 0.2$. [Expression 3]

The refractive index of the base layer may be 1.4 to 1.8.

A thickness of the low-refractive layer may be 600 nm or less.

The window cover film may have a total light transmittance of 91% or more when measured at 400 to 700 nm according to ASTM D1746.

The window cover film may have a reflectivity of 7% or less when measured according to ASTM E1164.

The window cover film may further include one or more functional coating layers selected from an antistatic layer, an anti-fingerprint layer, an anti-fouling layer, an anti-scratch layer, an anti-reflective layer, and an impact absorption layer, the functional coating layer being formed on the hard coating layer.

The window cover film may further include a protective film formed on the functional coating layer.

The hard coating layer may be formed of a silsesquioxane-based compound or a (meth)acrylate-based compound.

The low-refractive layer may include hollow or porous silica particles.

The base layer may have a modulus of 3 GPa or more when measured according to ASTM D882, an elongation at break of 8% or more when measured according to ASTM D882, a light transmittance of 5% or more when measured at 388 nm according to ASTM D1746, a total light transmittance of 87% or more when measured at 400 to 700 nm according to ASTM D1746, a haze of 2.0% or less, a yellow index of 5.0 or less, and a b* value of 2.0 or less.

The base layer may be formed of a polyamideimide (PAI)-based resin having a fluorine atom and an aliphatic cyclic structure.

The base layer may be formed of a polyamideimide (PAI)-based resin having a unit derived from a fluorine-based aromatic diamine, a unit derived from an aromatic dianhydride, a unit derived from an alicyclic dianhydride, and a unit derived from an aromatic diacid dichloride.

A thickness of the base layer may be 10 to 500 μm, and a thickness of the hard coating layer may be 1 to 80 μm.

A pencil hardness of the hard coating layer may be 2 H or higher and a water contact angle of the hard coating layer may be 80° or more.

In another general aspect, a flexible display panel includes the window cover film.

Other features and aspects will be apparent from the following detailed description, the drawings, and the claims.

DESCRIPTION OF THE INVENTION

Hereinafter, the present invention will be described in more detail. However, each of the following exemplary embodiments is merely one reference example for describing the present invention in detail, and the present invention is not limited thereto and may be implemented in various forms.

In addition, unless otherwise defined, all the technical terms and scientific terms used herein have the same meanings as commonly understood by those skilled in the art to which the present invention pertains. The terms used in the description of the present invention are merely used to effectively describe a specific exemplary embodiment, but are not intended to limit the present invention.

In addition, unless the context clearly indicates otherwise, the singular forms used in the specification and appended claims are intended to include the plural forms.

In addition, unless explicitly described to the contrary, "comprising" any components will be understood to imply further inclusion of other components rather than the exclusion of any other components.

The term "film" in the present invention may be a film obtained by applying a "polyamideimide-based resin solution" onto a base material and drying and peeling the polyamideimide-based resin solution, and the film may be stretched or not stretched.

The terms "curl" and "curling" in the present invention refer to bending-deformation of a film. The term "degree of curl" may refer to a vertical height from the lowest point of the film to a point where the film is bent and raised when a curled film is disposed on a plane.

The term "curl suppression property" used in the present specification may refer to a property in which the "degree of curl" is small.

The term "dynamic bending property" in the present invention may refer to a situation in which permanent deformation and/or damage does not occur at a deformed portion (for example, folded portion) even though the window cover film is repeatedly deformed (for example, folding and unfolding).

Hereinafter, the present invention will be described.

As a result of conducting intensive studies to solve the above problems, the present inventors found that in a case where a window cover film includes a hard coating layer, a base layer, and a low-refractive layer that are sequentially stacked, the base layer being formed of a polyamideimide-based resin, a refractive index of the low-refractive layer is less than 1.4, and a refractive index relationship satisfies the following Expression 1, since the window cover film has a high transmittance and a low reflectivity, the window cover film may implement a high resolution and have an anti-reflection function, which is suitable, thereby completing the present invention.

Refractive index of base layer>refractive index of hard coating layer>refractive index of low-refractive layer  [Expression 1]

In a range in which both the stacking order and the refractive index relationship expression are satisfied, a total light transmittance may be 91% or more when measured at 400 to 700 nm according to ASTM D1746, and a reflectivity may be 7% or less when measured according to ASTM E1164. In addition, in a range in which both the light transmittance and the reflectivity are satisfied, optical properties suitable for the window cover film may be provided, and the window cover film has excellent visibility and no optical defects such as a rainbow mura. Therefore, a high resolution may be implemented and the effect of reducing glare may be implemented.

The window cover film according to an exemplary embodiment of the present invention includes the hard coating layer, the base layer, and the low-refractive layer that are sequentially stacked, the base layer being formed of a polyamideimide-based resin, such that all of the desired physical properties may be achieved. The window cover film may further include another layer formed between the respective layers or on the hard coating layer, if necessary.

Specifically, for example, the window cover film may further include an adhesive layer and the like formed between the respective layers.

In addition, the window cover film may further include one or more functional coating layers selected from an antistatic layer, an anti-fingerprint layer, an anti-fouling layer, an anti-scratch layer, an anti-reflective layer, and an impact absorption layer, the functional coating layer being formed on the hard coating layer.

More specifically, according to a first exemplary embodiment of the present invention, a window cover film may include a hard coating layer, a base layer, and a low-refractive layer that are sequentially stacked in direct contact with each other, the base layer being formed of a polyamideimide-based resin and the low-refractive layer having a refractive index of less than 1.4, wherein a refractive index relationship satisfies the following Expression 1.

Refractive index of base layer>refractive index of hard coating layer>refractive index of low-refractive layer  [Expression 1]

In the first exemplary embodiment, according to a second exemplary embodiment of the present invention, the window cover film may further include one or more functional coating layers selected from an antistatic layer, an anti-fingerprint layer, an anti-fouling layer, an anti-scratch layer, an anti-reflective layer, and an impact absorption layer, the functional coating layer being formed on the hard coating layer.

In the second exemplary embodiment, according to a third exemplary embodiment of the present invention, the window cover film may further include a protective film formed on the functional coating layer.

The first to third exemplary embodiments are merely illustrative of exemplary embodiments of the present invention in more detail, but the present invention is not limited thereto.

The window cover film according to an exemplary embodiment of the present invention has mechanical properties and a dynamic bending property that are significantly improved by chemical bonding between the base layer and the hard coating layer. Specifically, the excellent and improved dynamic bending property means that the window cover film is not deformed and cracks in the window cover film do not occur even though the window cover film is repeatedly deformed, specifically, the window cover film is repeatedly folded and unfolded.

More specifically, the cracks may not occur, even though a bending operation is repeated 30,000 times or more, preferably 100,000 times or more, and more preferably 30,000 to 200,000 times, when measuring the dynamic bending property. The term "crack" may refer to a "fine crack".

The term "fine crack" used in the present specification may refer to a crack having a size that is not normally observed with the naked eye. The fine crack may refer to, for example, a crack having a width of 0.5 µm or more and a length of 10 µm or more, and may be observed with a microscope.

In addition, in the window cover film according to an exemplary embodiment of the present invention, a refractive index difference $\Delta n_1$ between the base layer and the low-refractive layer may satisfy the following Expression 2. When a range of the following Expression 2 is satisfied, it is possible to provide a window cover film having a high transmittance and a low reflectivity.

$$0.15 \leq \Delta n_1 \leq 0.4 \qquad \text{[Expression 2]}$$

The refractive index difference $\Delta n_1$ may be more preferably 0.25 to 0.35 and still more preferably 0.30 to 0.33.

In addition, in the window cover film according to an exemplary embodiment of the present invention, a refractive index difference $\Delta n_2$ between the base layer and the hard coating layer may satisfy the following Expression 3. When a range of the following Expression 3 is satisfied, it is possible to provide a window cover film having a high transmittance and a low reflectivity.

$$0.01 \leq \Delta n_2 \leq 0.2 \qquad \text{[Expression 3]}$$

The refractive index difference $\Delta n_2$ may be more preferably 0.05 to 0.18 and still more preferably 0.10 to 0.15.

In an exemplary embodiment of the present invention, the refractive index of the base layer may be 1.4 to 1.8, more preferably 1.5 to 1.7, and still more preferably 1.6 to 1.65.

In an exemplary embodiment of the present invention, the window cover film may have a total light transmittance of 91% or more, preferably 92% or more, and more preferably 93% or more, when measured at 400 to 700 nm according to ASTM D1746, and a reflectivity of 7% or less, preferably 6% or less, and more preferably 5% or less, when measured according to ASTM E1164.

Hereinafter, configurations of the respective layers of the present invention for satisfying the above physical properties will be described in detail. In the present invention, a component or a production method of each of the layers is not limited as long as the refractive index relationship and the physical properties described above are satisfied, but specific examples thereof are as follows.

<Base Layer>

The base layer has excellent optical properties and mechanical properties, and may be formed of a material having an elastic force and a restoring force.

In an exemplary embodiment of the present invention, a thickness of the base layer may be 10 to 500 µm, 20 to 250 µm, or 30 to 100 µm.

In an exemplary embodiment of the present invention, the base layer may have a modulus of 3 GPa or more, 4 GPa or more, or 5 GPa or more, when measured according to ASTM D882, an elongation at break of 8% or more, 12% or more, or 15% or more, when measured according to ASTM D882, a light transmittance of 5% or more or 5 to 80% when measured at 388 nm according to ASTM D1746, a total light transmittance of 87% or more, 88% or more, or 89% or more, when measured at 400 to 700 nm according to ASTM D1746, a haze of 2.0% or less, 1.5% or less, or 1.0% or less, when measured according to ASTM D1003, a yellow index of 5.0 or less, 3.0 or less, or 0.4 to 3.0, when measured according to ASTM E313, and a b* value of 2.0 or less, 1.3 or less, or 0.4 to 1.3, when measured according to ASTM E313.

In an exemplary embodiment of the present invention, the base layer may be formed of a polyamideimide-based resin.

In addition, the base layer may be more preferably formed of a polyamideimide-based resin having a fluorine atom and an aliphatic cyclic structure, and thus, the base layer may have excellent mechanical properties and dynamic bending property.

As a more specific example, the base layer may contain a polyamideimide-based resin derived from a fluorine-based aromatic diamine, an aromatic dianhydride, an alicyclic dianhydride, and an aromatic diacid dichloride.

In an exemplary embodiment of the present invention, as an example of the polyamideimide-based resin having a fluorine atom and an aliphatic cyclic structure, a polyamideimide polymer may be produced by producing an amine-terminated polyamide oligomer derived from a first fluorine-based aromatic diamine and an aromatic diacid dichloride and polymerizing and imidizing the amine-terminated polyamide oligomer and monomers derived from a second fluorine-based aromatic diamine, an aromatic dianhydride, and an alicyclic dianhydride, and in the case of the polymer, the object of the present invention is better achieved, which is preferable. However, the present invention is not limited thereto.

The first fluorine-based aromatic diamine and the second fluorine-based aromatic diamine may be the same as or different from each other.

As described above, in an exemplary embodiment of the present invention, in a case where an amine-terminated oligomer in which an amide structure is formed in a polymer chain by the aromatic diacid dichloride is included as a diamine monomer, the optical properties, and in particular, mechanical strength such as a modulus, may be improved, and the dynamic bending property may also be further improved. However, the present invention is not limited thereto.

In an exemplary embodiment of the present invention, when the resin has a fluorine-substituted polyamide oligomer block as described above, a molar ratio of the diamine monomer including the amine-terminated fluorine-substituted poly oligomer and the second fluorine-based aromatic diamine to the dianhydride monomer including the aromatic dianhydride and the alicyclic dianhydride of the present invention is preferably 1:0.9 to 1.1, and more preferably 1:1.

In addition, a content of the amine-terminated polyamide oligomer with respect to the entire diamine monomer is not particularly limited, but may be 30 mol % or more, preferably 50 mol % or more, and more preferably 70 mol % or more, in terms of satisfying the mechanical properties, the yellow index, and the optical properties of the present invention. In addition, when a polyamideimide-based film having a difference in surface energy according to the present invention is provided, selectivity of a coating solvent may be increased by a variety of solubilities.

In addition, a composition ratio of the aromatic dianhydride to the alicyclic dianhydride is not particularly limited, but is preferably 30 to 80 mol %:70 to 20 mol %, in consideration of achieving the transparency, the yellow index, and the mechanical properties of the present invention, but the present invention is not limited thereto.

In addition, as another example, the polyamideimide-based resin having a fluorine atom and an aliphatic cyclic structure may be a polyamideimide-based resin obtained by mixing, polymerizing, and imidizing a fluorine-based aromatic diamine, an aromatic dianhydride, an alicyclic dianhydride, and an aromatic diacid dichloride.

Such a resin has a random copolymer structure. A content of the aromatic diacid dichloride may be 40 moles or more, and preferably 50 to 80 moles, with respect to 100 moles of the diamine. A content of the aromatic dianhydride may be 10 to 50 moles with respect to 100 moles of the diamine. A content of the alicyclic dianhydride may be 10 to 60 moles with respect to 100 moles of the diamine. The polyamideimide-based resin may be produced by polymerizing a diacid dichloride and a dianhydride with respect to the diamine monomer in a molar ratio of 1:0.9 to 1.1, and more preferably 1:1.

The random polyamideimide according to the present invention is slightly different in solvent sensitivity from that of the block polyamideimide-based resin due to the optical properties such as transparency, the mechanical properties, and the difference in surface energy, but may also fall within the scope of the present invention.

In an exemplary embodiment of the present invention, as the fluorine-based aromatic diamine component, a mixture of 2,2'-bis(trifluoromethyl)-benzidine and another known aromatic diamine component may be used, but 2,2'-bis(trifluoromethyl)-benzidine may be used alone. By using such a fluorine-based aromatic diamine, the optical properties and the yellow index of the polyamideimide-based film may be improved. In addition, a tensile modulus of the polyamideimide-based film may be improved, and thus, the mechanical strength of the window cover film may be improved and the dynamic bending property of the window cover film may be further improved.

The aromatic dianhydride may be at least one or two or more of 4,4'-hexafluoroisopropylidene diphthalic anhydride (6FDA), biphenyltetracarboxylic dianhydride (BPDA), oxydiphthalic dianhydride (ODPA), sulfonyl diphthalic anhydride ($SO_2$DPA), (isopropylidenediphenoxy) bis(phthalic anhydride) (6HDBA), 4-(2,5-dioxotetrahydrofuran-3-yl)-1,2,3,4-tetrahydronaphthalene-1,2-dicarboxylic dianhydride (TDA), 1,2,4,5-benzene tetracarboxylic dianhydride (PMDA), benzophenone tetracarboxylic dianhydride (BTDA), bis(carboxyphenyl) dimethyl silane dianhydride (SiDA), and bis(dicarboxyphenoxy) diphenyl sulfide dianhydride (BDSDA), but the present invention is not limited thereto.

As an example, the alicyclic dianhydride may be one or a mixture of two or more selected from the group consisting of 1,2,3,4-cyclobutanetetracarboxylic dianhydride (CBDA), 5-(2,5-dioxotetrahydrofuryl)-3-methylcyclohexene-1,2-dicarboxylic dianhydride (DOCDA), bicyclo[2.2.2]oct-7-ene-2,3,5,6-tetracarboxylic dianhydride (BTA), bicyclooctene-2,3,5,6-tetracarboxylic dianhydride (BODA), 1,2,3,4-cyclopentanetetracarboxylic dianhydride (CPDA), 1,2,4,5-cyclohexanetetracarboxylic dianhydride (CHDA), 1,2,4-tricarboxy-3-methylcarboxycyclopentane dianhydride (TMDA), 1,2,3,4-tetracarboxycyclopentane dianhydride (TCDA), and derivatives thereof.

In an exemplary embodiment of the present invention, in the case where the amide structure is formed in the polymer chain by the aromatic diacid dichloride, the optical properties, and in particular, the mechanical strength such as a modulus, may be significantly improved, and the dynamic bending property may also be further improved.

The aromatic diacid dichloride may be one or a mixture of two or more selected from the group consisting of isophthaloyl dichloride (IPC), terephthaloyl dichloride (TPC), [1,1'-biphenyl]-4,4'-dicarbonyl dichloride (BPC), 1,4-naphthalene dicarboxylic dichloride (NPC), 2,6-naphthalene dicarboxylic dichloride (NTC), 1,5-naphthalene dicarboxylic dichloride (NEC), and derivatives thereof, but the present invention is not limited thereto.

In the present invention, a weight average molecular weight of the polyamideimide-based resin is not particularly limited, but may be 200,000 g/mol or more, preferably 300,000 g/mol or more, and more preferably 200,000 to 500,000 g/mol. In addition, a glass transition temperature of the polyamideimide-based resin is not limited, but may be 300 to 400° C., and more specifically, 330 to 380° C. Within the above range, a film having a high modulus, excellent mechanical strength, excellent optical properties, and a low occurrence of curl may be provided, which is preferable, but the present invention is not limited thereto.

<Method of Producing Base Layer>

Hereinafter, a non-limiting example of a method of producing a film as a base layer will be described.

In an exemplary embodiment of the present invention, the base layer may be produced by applying a "polyamideimide-based resin solution" including a polyamideimide-based resin and a solvent onto a base material, and performing drying or drying and stretching. That is, the base layer may be produced by a solution casting method.

As an example, the base layer may be produced by a step of producing an oligomer by reacting a fluorine-based aromatic diamine with an aromatic diacid dichloride, a step of preparing a polyamic acid solution by reacting the produced oligomer with a fluorine-based aromatic diamine, an aromatic dianhydride, and an alicyclic dianhydride, a step of producing a polyamideimide-based resin by imidizing the polyamic acid solution, and a step of applying a polyamideimide solution obtained by dissolving the polyamideimide-based resin in an organic solvent.

Hereinafter, each of steps of producing a block polyamideimide-based film having a refractive index of 1.4 to 1.8 will be described.

The step of producing the oligomer may include a step of reacting a fluorine-based aromatic diamine with an aromatic diacid dichloride in a reactor and a step of purifying and drying the obtained oligomer.

In this case, the fluorine-based aromatic diamine may be added in a molar ratio of 1.01 to 2 relative to the aromatic diacid dichloride to produce an amine-terminated polyamide oligomer. A molecular weight of the oligomer is not particularly limited, but, for example, when a weight average molecular weight thereof is within a range of 1,000 to 3,000 g/mol, the film may have more excellent physical properties. In this case, the oligomer is polymerized in the presence of pyridine to suppress a side reaction, and thus, a resin having more excellent physical properties may be produced.

In addition, an aromatic carbonyl halide monomer such as terephthaloyl chloride or isophthaloyl chloride rather than terephthalic acid ester or terephthalic acid itself is preferably used to introduce an amide structure, which seems to affect the physical properties of the film due to a chloride element, although the reason is not clear.

Next, the step of preparing the polyamic acid solution may be performed by a solution polymerization reaction in which the produced oligomer is reacted with the fluorine-based aromatic diamine, the aromatic dianhydride, and the alicyclic dianhydride in an organic solvent.

As an example, the organic solvent used for the polymerization reaction in this case may be one or two or more polar solvents selected from dimethylacetamide (DMAc), N-methyl-2-pyrrolidone (NMP), dimethylformamide (DMF), dimethyl sulfoxide (DMSO), ethyl cellosolve, methyl cellosolve, acetone, diethyl acetate, and m-cresol.

Next, in the present invention, the imidization step may be performed through chemical imidization. More preferably, the polyamic acid solution is chemically imidized using pyridine and acetic anhydride. The polyamic acid solution may be imidized using an imidization catalyst and a dehydrating agent at a low temperature of 150° C. or lower, preferably 100° C. or lower, and more preferably, 50 to 150° C.

In the case where the polyamic acid solution is chemically imidized, mechanical properties may be uniformly imparted to the entire film as compared to a case where the polyamic acid solution is imidized by heat at a high temperature.

One or two or more selected from pyridine, isoquinoline, and β-quinoline may be used as the imidization catalyst. In addition, one or two or more selected from acetic anhydride, phthalic anhydride, and maleic anhydride may be used as the dehydrating agent, but the present invention is not limited thereto.

In addition, the polyamideimide-based resin may be produced by mixing the polyamic acid solution with an additive such as a retardant, a tackifier, an inorganic particle, an antioxidant, an ultraviolet stabilizer, or a plasticizer.

In the present invention, a weight average molecular weight of the polyamideimide-based resin is not particularly limited, but may be 200,000 g/mol or more, preferably 300,000 g/mol or more, and more preferably 300,000 to 400,000 g/mol. Within the above range, in a case where the film is formed and then the hard coating layer is formed on the film, the occurrence of curl may be prevented, and a more excellent dynamic bending property may be provided by chemical bonding with the hard coating layer, which is preferable, but the present invention is not limited thereto.

In the present invention, in the formation of the film, a polyamideimide-based resin may be produced in the imidization step, the produced polyamideimide-based resin may be purified, and the purified polyamideimide-based resin may be dissolved in a solvent such as N,N-dimethylacetamide (DMAc), thereby preparing a film forming solution.

In the present invention, the base layer may be produced by applying the polyamideimide solution on a base material and drying the polyamideimide solution in a drying step divided into a drying region or additionally performing a stretching step after or before the drying step. Alternatively, the base layer may be produced by additionally performing a heat treatment step after the drying step and/or the stretching step. The base material on which the solution is casted is not particularly limited, but for example, glass, stainless steel, or another base film may be used as a base material. However, the present invention is not limited thereto. The polyamideimide solution according to the present invention may be applied onto the base layer by a die coating method, an air knife coating method, a reverse roll coating method, a spray coating method, a blade coating method, a casting coating method, a gravure coating method, a spin coating method, or the like. However, in general, the solution coating method may be used without limitation.

In the present invention, the method of producing a base layer is not particularly limited as long as the above physical properties of the present invention are obtained, and as an example of a method for obtaining the physical properties of the present invention, it is more preferable to perform drying when producing a film so that a residual solvent content is 0.5% or less so as to produce a base layer having a desired refractive index, specifically, a refractive index of 1.4 to 1.8.

As a more specific example, a polyamideimide solution is casted on a support to form a film, and the film is peeled off from the support by primary drying in a state where a residual solvent content is 15 wt % or less. In the primary drying, the drying may be performed in two or more drying regions, and for example, the drying may be performed in a first drying region at 70 to 90° C., a second drying region at 90 to 120° C., and a third drying region at 120 to 150° C.

Subsequently, the peeled film may be subjected to secondary drying in a state where the film is fixed using a clip or a pin type jig at 200° C. to 300° C. and 300° C. to 350° C. so that the residual solvent content is 0.5% or less, and more preferably 0.3% or less. In this case, a refractive index may be adjusted by adjusting the residual solvent content by an additional heat treatment using an IR heater or the like.

<Hard Coating Layer>

The hard coating layer according to an exemplary embodiment of the present invention is formed to protect the base layer having the excellent optical properties and mechanical properties from external physical and chemical damage.

In an exemplary embodiment of the present invention, the hard coating layer may have a thickness of 1 to 50% of the entire thickness of the window cover film. Specifically, the hard coating layer may maintain optical properties while having an excellent hardness. The thickness of the hard coating layer may be 1 to 80 μm, preferably 1 to 50 μm, and more preferably 1 to 30 μm. When the thickness of the hard coating layer is within the above range, the hard coating layer may maintain flexibility while having the excellent hardness, such that a curl may not substantially occur.

In addition, a pencil hardness of the hard coating layer may be 2 H or higher, 3 H or higher, or 4 H or higher, and preferably 4 H to 9 H. When a scratch test is performed using steel wool (#0000, Liberon Limited), scratches are not generated at 10 times/1 Kgf, 20 times/1 Kgf, or 30 times/1 Kgf. A water contact angle of the hard coating layer may be 80° or more, 90° or more, or 100° or more.

A composition of the hard coating layer is not limited as long as it is possible to form a hard coating layer that imparts the above properties and satisfies a refractive index lower than that of the base layer, and more specifically, a refractive index lower than that of the base layer by 0.01 to 0.2.

As for a hard coating layer having a refractive index of 1.4 to 1.8 and formed on the base layer, as an example for forming a hard coating layer having a refractive index of 1.2 to 1.79, preferably 1.4 to 1.7, and more preferably 1.5 to 1.55, the hard coating layer may contain a silsesquioxane-based compound or a (meth)acrylate-based compound as a main component. More specifically, the silsesquioxane-based compound may be an alicyclic epoxidized silsesquioxane-based compound.

In this case, a weight average molecular weight of the silsesquioxane-based compound may be 1,000 to 20,000 g/mol. When the weight average molecular weight of the silsesquioxane-based compound is within the above range, a composition for forming a hard coating layer may have an appropriate viscosity. Therefore, flowability, applicability, and curing reactivity of the composition for forming a hard coating layer may be improved. In addition, the hardness of the hard coating layer may be improved. In addition, flexibility of the hard coating layer is improved, such that the occurrence of curl may be prevented. Preferably, the weight average molecular weight of the silsesquioxane-based compound may be 1,000 to 18,000 g/mol and more preferably 2,000 to 15,000 g/mol. The weight average molecular weight is measured using gel permeation chromatography (GPC).

The silsesquioxane-based compound has, for example, a trialkoxysilane compound-derived repeating unit represented by the following Formula 1.

 [Formula 1]

wherein A represents C1-C10 linear or branched alkyl group in which a C3-C7 alicyclic alkyl group is substituted with epoxy, and R is independently a C1-C3 alkyl group.

Here, the alkoxysilane compound may be one or more of 2-(3,4-epoxycyclohexyl)ethyltrimethoxysilane, 2-(3,4-epoxycyclohexyl)ethyltriethoxysilane, and 3-glycidoxypropyltrimethoxysilane, but the present invention is not limited thereto.

In addition, in an exemplary embodiment of the present invention, the silsesquioxane-based compound may have a trialkoxysilane compound-derived repeating unit represented by Formula 1 and a dialkoxysilane compound-derived repeating unit represented by the following Formula 2. In this case, the silsesquioxane-based compound may be prepared by mixing 0.1 to 100 parts by weight of a dialkoxysilane compound with respect to 100 parts by weight of a trialkoxysilane compound and performing condensation polymerization of the mixture. In this case, although the reason is not clear, a surface hardness is increased and the bending property is significantly improved, which is more preferable. It is considered that the bending property is more efficiently exhibited by the alicyclic alkyl group substituted with epoxy in Formula 1, and the effect thereof is more increased as compared to a case where an alicyclic group is absent.

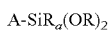 [Formula 2]

wherein $R_a$ is a linear or branched alkyl group selected from C1 to C5, and A and R are as defined in Formula 1.

Specific examples of the compound of Formula 2 may include 2-(3,4-epoxycyclohexyl)ethylmethyldimethoxysilane, 2-(3,4-epoxycyclohexyl)ethylpropyldimethoxysilane, 2-(3,4-epoxycyclohexyl)ethylmethyldiethoxysilane, and 2-(3,4-epoxycyclopentyl)ethylmethyldiethoxysilane, but the present invention is not limited thereto. These compounds may be used alone or as a mixture of two or more thereof.

In addition, in an exemplary embodiment of the present invention, the hard coating layer may include an inorganic filler. For example, a metal oxide such as silica, alumina, or titanium oxide; hydroxide such as aluminum hydroxide, magnesium hydroxide, or potassium hydroxide; a metal particle such as gold, silver, copper, nickel, or alloys thereof; a conductive particle such as carbon, carbon nanotube, or fullerene; glass; or ceramic may be used as the inorganic filler. Preferably, silica may be used in terms of compatibility of the composition with other components. These inorganic fillers may be used alone or as a mixture of two or more thereof.

In addition, the hard coating layer may further include a slip agent. The slip agent may improve winding efficiency, blocking resistance, abrasion resistance, scratch resistance, or the like. For example, waxes such as polyethylene wax, paraffin wax, synthetic wax, and montan wax; and synthetic resins such as a silicone-based resin and a fluorine-based resin may be used as the slip agent. These slip agents may be used alone or as a mixture of two or more thereof.

Hereinafter, a method of forming the hard coating layer will be described in detail.

The hard coating layer is formed by preparing a composition for forming a hard coating layer, and applying and curing the composition onto the base layer.

In an exemplary embodiment of the present invention, a composition for forming a hard coating layer according to a first aspect may include an epoxy-siloxane-based resin, a cross-linking agent, and a photoinitiator.

In addition, the composition for forming a hard coating layer may further include an epoxy-based monomer, a photoinitiator and/or a thermal initiator, a solvent, a thermosetting agent, an inorganic filler, a slip agent, an antioxidant, a UV absorber, a light stabilizer, a thermal polymerization inhibitor, a leveling agent, a surfactant, a lubricant, or an antifoulant.

The cross-linking agent may form a cross-linking bond with an epoxy siloxane-based resin to solidify the composition for forming a hard coating layer, such that the hardness of the hard coating layer may be increased.

For example, the cross-linking agent may contain a compound represented by the following Formula 3. The cross-linking agent, which is an alicyclic epoxy compound having the same epoxy unit as those in structures of Formula 1 and Formula 2, promotes cross-linking bonding and allows the hard coating layer to maintain a refractive index, such that a viewing angle may not be changed, the bending property may be maintained, and transparency may not be damaged, which is preferable.

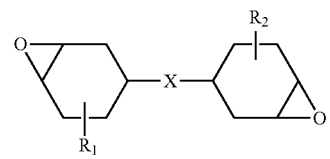 [Formula 3]

wherein $R_1$ and $R_2$ each independently may represent hydrogen or a linear or branched alkyl group having 1 to 5 carbon atoms, and X may be a direct bond; a carbonyl group; a carbonate group; an ether group; a thioether group; an ester group; an amide group; a linear or branched alkylene group, alkylidene group, or alkoxylene group having 1 to 18 carbon atoms; a cycloalkylene group or cycloalkylidene group having 1 to 6 carbon atoms; or a connecting group thereof.

Here, the "direct bond" refers to a structure which is directly bonded without other functional groups. For example, in Formula 3, the direct bond may refer to two cyclohexanes directly connected to each other. In addition, the "connecting group" refers to two or more above-described substituents connected to each other. In addition, in Formula 3, substitution positions of $R_1$ and $R_2$ are not particularly limited, but when the carbon connected to X is set at position 1, and the carbons connected to epoxy groups are set at positions 3 and 4, it is more preferable that $R_1$ and $R_2$ are substituted at position 6.

According to exemplary embodiments, the compound having an alicyclic epoxy group may be obtained by connecting two 3,4-epoxycyclohexyl groups. The compound having an alicyclic epoxy group may be similar in structure and properties to those of the epoxy siloxane resin. In this case, cross-linking bonding of the epoxy siloxane resin may be promoted and the composition may be maintained at an appropriate viscosity.

A content of the cross-linking agent is not particularly limited, but may be, for example, 1 to 150 parts by weight with respect to 100 parts by weight of the epoxy siloxane resin. When the content of the cross-linking agent is within the above range, the viscosity of the composition for forming a hard coating layer may be maintained in an appropriate range, and applicability and curing reactivity may be improved.

In addition, in an exemplary embodiment of the present invention, various epoxy compounds may be added in addition to the above-described compounds of the formulas as long as the characteristics of the present invention are achieved, but a content thereof is preferably less than 20 parts by weight with respect to 100 parts by weight of the compound of Formula 2.

In an exemplary embodiment of the present invention, the epoxy-based monomer may be included in an amount of 10 to 80 parts by weight with respect to 100 parts by weight of the composition for forming a hard coating layer. Within the above content range, the viscosity may be adjusted, the thickness may be easily adjusted, a surface may be uniform, a defect in a thin film may not occur, and the hardness may be sufficiently achieved, but the present invention is not limited thereto.

In an exemplary embodiment of the present invention, the photoinitiator is a photo-cationic initiator. The photo-cationic initiator may initiate condensation of the epoxy-based monomer including the above-described compounds. As the photo-cationic initiator, for example, an onium salt and/or an organic metal salt may be used, but the present invention is not limited thereto. For example, a diaryliodonium salt, a triarylsulfonium salt, an aryldiazonium salt, an iron-arene complex, or the like may be used. These photo-cationic initiators may be used alone or as a mixture of two or more thereof.

A content of the photoinitiator is not particularly limited, but may be, for example, 0.1 to 10 parts by weight, and preferably 0.2 to 5 parts by weight, with respect to 100 parts by weight of the compound of Formula 1.

In an exemplary embodiment of the present invention, non-limiting examples of the solvent may include alcohols such as methanol, ethanol, isopropanol, butanol, methyl cellosolve, and ethyl cellosolve; ketones such as methyl ethyl ketone, methyl butyl ketone, methyl isobutyl ketone, diethyl ketone, dipropyl ketone, and cyclohexanone; hexanes such as hexane, heptane, and octane; and benzenes such as benzene, toluene, and xylene. These solvents may be used alone or as a mixture of two or more thereof.

In an exemplary embodiment of the present invention, the solvent may be included in a residual amount excluding the amount of the remaining components in a total weight of the composition.

As an exemplary embodiment, the composition for forming a hard coating layer may further include a thermosetting agent. Examples of the thermosetting agent may include a sulfonium salt-based thermosetting agent, an amine-based thermosetting agent, an imidazole-based thermosetting agent, an acid anhydride-based thermosetting agent, and an amide-based thermosetting agent. It is more preferable that a sulfonium salt-based thermosetting agent may be used in terms of implementing discoloration prevention and a high hardness. These thermosetting agents may be used alone or as a mixture of two or more thereof. A content of the thermosetting agent is not particularly limited, but may be, for example, 5 to 30 parts by weight with respect to 100 parts by weight of the epoxy siloxane resin. When the content of the thermosetting agent is within the above range, curing efficiency of the composition for forming a hard coating layer is further improved, such that a hard coating layer having an excellent hardness may be formed.

In an exemplary embodiment of the present invention, by using the composition for forming a hard coating layer, the base layer may be physically protected, the mechanical properties of the base layer may be further improved, and the hybrid folding resistance capacity that does not generate micro-cracks may be further improved even when a bending operation is repeatedly performed. In addition, adhesion with a functional coating layer to be described below and coatability may be further improved, such that it is possible to provide a window cover film having uniform physical properties over the entire area of the film. Specifically, it is possible to provide a window cover film in which cracks do not occur even though a bending operation is repeated 30,000 times or more, more specifically 30,000 to 200,000 times, and most preferably 200,000 times or more, when evaluating the hybrid folding resistance capacity.

In addition, various epoxy compounds may be added to the hard coating layer of the present invention in addition to the above-described compounds of the formulas as long as the characteristics of the present invention are achieved, but a content thereof is preferably less than 20 parts by weight with respect to 100 parts by weight of the compound of Formula 1, in terms of achieving the object of the present invention.

A polymerization method of the alicyclic epoxidized silsesquioxane-based compound according to the present invention is not limited as long as it is a known method, but the alicyclic epoxidized silsesquioxane-based compound may be prepared, for example, by hydrolysis and a condensation reaction between alkoxy silanes in the presence of water. The hydrolysis may accelerate a reaction by including a component such as an inorganic acid. In addition, the epoxy silane-based resin may be formed by polymerization of a silane compound having an epoxycyclohexyl group.

In addition, a composition for forming a hard coating layer according to a second aspect of the present invention may include a (meth)acrylate-based oligomer, a polyfunctional (meth)acrylate-based monomer, and an initiator. The (meth)acrylate refers to acrylate or methacrylate.

More specifically, the (meth)acrylate-based oligomer is not particularly limited as long as the object of the present invention is achieved, and specific examples thereof may include polyester (meth)acrylate, urethane (meth)acrylate, epoxy (meth)acrylate, and polyether (meth)acrylate. These (meth)acrylate-based oligomers may be used alone or as a mixture of two or more thereof. The oligomer may have 2 to 20 repeating units.

The polyfunctional (meth)acrylate-based monomer may refer to polyfunctional (meth)acrylate having two or more (meth)acrylate functional groups, and may induce a cross-linking reaction.

The polyfunctional (meth)acrylate-based monomer is not particularly limited as long as the object of the present invention is achieved, and specific examples thereof may include 2-ethylhexyl acrylate, octadecyl acrylate, isodecyl acrylate, 2-phenoxyethyl acrylate, lauryl acrylate, stearyl acrylate, behenyl acrylate, tridecyl methacrylate, nonylphenol ethoxylate monoacrylate, β-carboxyethyl acrylate, isobornyl acrylate, tetrahydrofurfuryl acrylate, tetrahydrofurfuryl methacrylate, 4-butyl-cyclohexyl acrylate, dicyclopentenyl acrylate, dicyclopentenyl oxyethyl acrylate, ethoxyethoxy ethyl acrylate, ethoxylated monoacrylate, 1,6-hexanediol diacrylate, triphenyl glycol diacrylate, butanediol diacrylate, 1,3-butylene glycol dimethacrylate, 1,6-hexanediol dimethacrylate, neopentyl glycol diacrylate, ethylene glycol dimethacrylate, diethylene glycol diacrylate, diethylene glycol dimethacrylate, tetraethylene glycol diacrylate, tetraethylene glycol dimethacrylate, triethylene glycol diacrylate, triethylene glycol dimethacrylate, polyethylene glycol diacrylate, polyethylene glycol dimethacrylate, dipropylene glycol diacrylate, ethoxylated neopentyl glycol diacrylate, trimethylolpropane triacrylate, trimethylolpropane trimethacrylate, pentaerythritol triacrylate, pentaerythritol trimethacrylate, pentaerythritol tetramethacrylate, pentaerythritol tetraacrylate, dipentaerythritol pentaacrylate, dipentaerythritol hexaacrylate, dipentaerythritol pentamethacrylate, dipentaerythritol hexamethacrylate, phosphazene acrylate, phosphazene methacrylate, ethoxylated triacrylate, tris(2-hydroxyethyl)isocyanurate triacrylate, dipentaerythritol pentaacrylate, ditrimethylolpropane tetraacrylate, and alkoxylated tetraacrylate. Preferred examples thereof may include pentaerythritol triacrylate, pentaerythritol trimethacrylate, pentaerythritol tetramethacrylate, pentaerythritol tetraacrylate, dipentaerythritol pentaacrylate, dipentaerythritol hexaacrylate, dipentaerythritol pentamethacrylate, dipentaerythritol hexamethacrylate, phosphazene acrylate, and phosphazene methacrylate. These polyfunctional (meth)acrylate-based monomers may be used alone or as a mixture of two or more thereof.

The composition for forming a hard coating layer according to the second aspect may further include a general thermal initiator or photoinitiator.

Any photoinitiator may be used as long as photopolymerization of the (meth)acrylate-based compound may be initiated, and examples thereof may include benzoin, benzoin methyl ether, benzoin ethyl ether, benzoin isopropyl ether, benzoin-n-butyl ether, benzoin isobutyl ether, acetophenone, hydroxydimethylacetophenone, dimethylaminoacetophenone, dimethoxy-2-phenylacetophenone, 3-methylacetophenone, 2,2-dimethoxy-2-phenylacetophenone, 2,2-diethoxy-2-phenylacetophenone, 4-chloroacetophenone, 4,4-dimethoxyacetophenone, 2-hydroxy-2-methyl-1-phenylpropan-1-one, 4-hydroxycyclophenylketone, 1-hydroxycyclohexylphenylketone, 2-methyl-1-[4-(methylthio)phenyl]-2-morpholino-propan-1-one, 4-(2-hydroxyethoxy)phenyl-2-(hydroxy-2-propyl)ketone, benzophenone, p-phenylbenzophenone, 4,4-diaminobenzophenone, 4,4'-diethylaminobenzophenone, dichlorobenzophenone, anthraquinone, 2-methylanthraquinone, 2-ethylanthraquinone, 2-t-butylanthraquinone, 2-aminoanthraquinone, 2-dimethylthioxanthone, 2-ethylthioxanthone, 2-chlorothioxanthone, 2,4-dimethylthioxanthone, 2,4-diethylthioxanthone, benzyl dimethyl ketal, diphenyl ketone benzyl dimethyl ketal, acetophenone dimethyl ketal, p-dimethylaminobenzoic acid ester, 2,4,6-trimethylbenzoyl-diphenyl-phosphine oxide, fluorene, triphenylamine, and carbazole. These photoinitiators may be used alone or as a mixture of two or more thereof.

A content of the photoinitiator is not particularly limited, but may be, for example, 0.1 to 20 wt % with respect to a total weight of the composition for forming a hard coating layer.

The composition for forming a hard coating layer according to the second aspect may further include a solvent.

The solvent is not particularly limited, and a solvent known in the art may be used. Examples thereof may include an alcohol-based solvent (methanol, ethanol, isopropanol, butanol, methyl cellosolve, ethyl cellosolve, or the like), a ketone-based solvent (methyl ethyl ketone, methyl butyl ketone, methyl isobutyl ketone, diethyl ketone, dipropyl ketone, cyclohexanone, or the like), a hexane-based solvent (hexane, heptane, octane, or the like), and a benzene-based solvent (benzene, toluene, xylene, or the like). These solvents may be used alone or as a mixture of two or more thereof.

A content of the solvent is not particularly limited, but may be, for example, 10 to 60 wt % with respect to the total weight of the composition for forming a hard coating layer. When the content of the solvent is within the above range, an appropriate viscosity may be maintained, such that workability may be excellent, a thickness of a coating film may be easily adjusted, and a process speed may be improved.

The composition for forming a hard coating layer of the present invention may further include a slip agent, if necessary, in order to improve winding efficiency, blocking resistance, abrasion resistance, and scratch resistance.

The type of the slip agent is not particularly limited, and examples thereof may include waxes such as polyethylene wax, paraffin wax, synthetic wax, and montan wax; and synthetic resins such as a silicone-based resin and a fluorine-based resin. These slip agents may be used alone or as a mixture of two or more thereof. A content of the slip agent is not particularly limited, but may be, for example, 0.1 to 5 wt % with respect to the total weight of the composition for forming a hard coating layer. When the content of the slip agent is within the above range, excellent transparency may be maintained while imparting excellent blocking resistance, abrasion resistance, and scratch resistance.

In addition, the composition for forming a hard coating layer may further include an additive such as an antioxidant, a UV absorber, a light stabilizer, a thermal polymerization inhibitor, a leveling agent, a surfactant, a lubricant, or an antifoulant, if necessary.

Hereinafter, a method of forming the hard coating layer will be described in detail.

In an exemplary embodiment of the present invention, the hard coating layer may be formed by applying and curing the composition for forming a hard coating layer on one surface of the base layer. The curing may be performed by thermal curing and/or photo-curing, and may be performed by using a method known in the art.

The application may be performed by a known method such as a die coating method, an air knife coating method, a reverse roll coating method, a spray coating method, a blade coating method, a casting coating method, a gravure coating method, or a spin coating method.

A curing method is not particularly limited, but curing may be performed by, for example, a method of performing photo-curing or thermal curing alone, performing thermal curing after photo-curing, or performing photo-curing after thermal curing.

In an exemplary embodiment of the present invention, by using the composition for forming a hard coating layer, the base layer may be physically protected, the mechanical properties may be further improved, the dynamic bending property may be further improved, and the occurrence of curl may be significantly reduced.

Specifically, it is possible to provide a window cover film in which cracks do not occur even though a bending operation is repeated 30,000 times or more, more specifically 30,000 to 200,000 times, and most preferably 200,000 times or more, when evaluating the dynamic bending property. In addition, it is possible to provide a window cover film having a degree of curl of 5 mm or less, preferably 4 mm or less, more preferably 3 mm or less, and still more preferably 0 to 2 mm when measured by an evaluation method to be described below.

In an exemplary embodiment of the present invention, a plurality of base layers and a plurality of hard coating layers may be stacked. For example, each of the plurality of base layers and the plurality of hard coating layers may be alternately stacked. In addition, the hard coating layer may be disposed on one surface or each of both surfaces of the base layer.

In an exemplary embodiment of the present invention, the base layer formed of a polyamideimide-based resin and the hard coating layer formed on one surface of the based layer are stacked, such that uniform physical properties may be exhibited by chemical bonding between the base layer and the hard coating layer, thereby exhibiting uniform physical properties on the entire area of the film.

In some exemplary embodiments, the window cover film may have a degree of curl of 5 mm or less, preferably 4 mm or less, more preferably 3 mm or less, and particularly preferably 0 to 2 mm.

<Low-Refractive Layer>

In an exemplary embodiment of the present invention, the low-refractive layer may be formed to control occurrence of an interference mura or a rainbow mura due to a refractive index difference between the hard coating layer and the base layer.

It is preferable that the low-refractive layer according to an exemplary embodiment of the present invention has a refractive index lower than that of each of the hard coating layer and the base layer. More preferably, the refractive index difference $\Delta n_1$ between the base layer and the low-refractive layer may be preferably 0.15 to 0.4, and the refractive index of the low-refractive layer may be less than 1.4. Within the above range, the transmittance may be high, the reflectivity may be low, and the occurrence of the interference mura or the rainbow mura may be minimized.

A thickness of the low-refractive layer according to an exemplary embodiment of the present invention may be 600 nm or less, preferably 550 nm or less, more preferably 500 nm or less, and specifically, 50 to 600 nm. Within the above thickness range, the desired transmittance may be high, the reflectivity may be low, and the occurrence of the interference mura or the rainbow mura may be minimized, which is preferable. However, the present invention is not limited thereto.

A composition of the low-refractive layer according to an exemplary embodiment of the present invention is not limited as long as the above properties are imparted and the low-refractive layer which satisfies a refractive index lower than that of each of the hard coating layer and the base layer, and more specifically, a refractive index lower than that of the base layer by 0.15 to 0.4 is formed. More specifically, the refractive index of the low-refractive layer may be 1.2 to 1.4, and more preferably 1.2 to 1.35.

According to an exemplary embodiment, a composition for forming a low-refractive layer may include, but is not limited to, hollow or porous silica particles. More specifically, the composition for forming a low-refractive layer may include hollow or porous silica particles, a (meth) acrylic monomer, and a (meth)acrylic oligomer.

Hollow silica particles may be used as the silica particles and may serve to lower a refractive index, thereby improving anti-reflection properties and further improving scratch resistance.

A refractive index of the hollow silica particle is preferably 1.17 to 1.40, preferably 1.17 to 1.35, and most preferably 1.17 to 1.32. Here, the refractive index does not mean a refractive index of silica, that is, a refractive index of the outer portion forming the hollow particle, but means a refractive index of the entire particle. The refractive index of the hollow silica particle is measured using an Abbe refractometer (product of ATAGO CO., LTD.).

In this case, a porosity of the hollow silica particle is preferably 10 to 60%, more preferably 20 to 60%, and most preferably 30 to 60%.

The hollow silica particles may be crystalline particles or noncrystalline particles, and are preferably monodispersed particles. Spherical particles are most preferred in consideration of the shape, but amorphous particles may also be used without problems. An average particle diameter of the hollow silica particles is also measured using an electron micrograph.

Hollow silica particles subjected to a surface treatment with a silane coupling agent may be used. In this case, dispersibility of the particles in a solvent may be improved, and the particles may participate in curing in a curing process to form a network with the binder, thereby improving durability of the low-refractive layer.

Specifically, the silane coupling agent may be at least one selected from the group consisting of methyltrimethoxysilane, dimethyldimethoxysilane, phenyltrimethoxysilane, diphenyldimethoxysilane, methyltriethoxysilane, dimethyldiethoxysilane, phenyltriethoxysilane, diphenyldiethoxysilane, isobutyltrimethoxysilane, vinyltrimethoxysilane, vinyltriethoxysilane, vinyltris(β-methoxyethoxy)silane, 3,3,3-trifluoropropyltrimethoxysilane, methyl-3,3,3-trifluoropropyldimethoxysilane, β-(3,4-epoxycyclohexyl)ethyltrimethoxysilane, γ-glycidoxymethyltrimethoxysilane, γ-glycidoxymethyltriethoxysilane, γ-glycidoxyethyltrimethoxysilane, γ-glycidoxyethyltriethoxysilane, γ-glycidoxypropyltrimethoxysilane, γ-glycidoxypropyltriethoxysilane, γ-(βglycidoxymethoxy)propyltrimethoxysilane, γ-(meth)acryloyloxymethyltrimethoxysilane, γ-(meth)acryloyloxymethyltriethoxysilane, γ-(meth)acryloyloxyethyltrimethoxysilane, γ-(meth)acryloyloxyethyltriethoxysilane, γ-(meth)acryloyloxypropyltrimethoxysilane, γ-(meth)acryloyloxypropyltriethoxysilane, butyltrimethoxysilane, isobutyltriethoxysilane, hexyltriethoxysilane, octyltriethoxysilane, decyltriethoxysilane, butyltriethoxysilane, isobutyltriethoxysilane, hexyltriethoxysilane, octyltriethoxysilane, 3-ureidoisopropylpropyltriethoxysilane, perfluorooctylethyltrimethoxysilane, perfluorooctylethyltriethoxysilane, perfluorooctylethyltriisopropoxysilane, trifluoropropyltrimethoxysilane, N-β-(aminoethyl)-γ-aminopropylmethyldimethoxysilane, N-β-(aminoethyl)-γ-aminopropyltrimethoxysilane, N-phenyl-γ-aminopropyltrimethoxysilane, γ-mercaptopropyltrimethoxysilane, trimethylsilanol, and methyltrichlorosilane.

In order to further improve the dispersibility of the silica particles, the inorganic particles may be used in a dispersion liquid state in which a (meth)acrylic monomer, a (meth) acrylic oligomer, and the like are dispersed. In this case, a solid content of the silica particles is preferably 10 to 30 wt %.

Since the types of the (meth)acrylic monomer and the (meth)acrylic oligomer are the same as described in the composition for forming a hard coating layer, an overlapping description will be omitted.

As the solvent used in the composition for forming a low-refractive layer, one or a mixture of two or more selected from methanol, ethanol, isopropanol, butanol, methyl cellosolve, ethyl cellosolve, methyl ethyl ketone, methyl butyl ketone, methyl isobutyl ketone, diethyl ketone, dipropyl ketone, cyclohexanone, hexane, heptane, octane, benzene, toluene, and xylene may be used, but the present invention is not limited thereto.

<Functional Coating Layer>

According to an exemplary embodiment of the present invention, the functional coating layer is a layer for imparting functionality to the window cover film and may be applied in various forms depending on a purpose.

As a specific example, the functional coating layer may include one or more layers selected from an antistatic layer, an anti-fingerprint layer, an anti-fouling layer, an anti-scratch layer, an anti-reflective layer, and an impact absorption layer, but the present invention is not limited thereto.

Even in a case where various functional coating layers are formed on the polyamideimide-based film as described above, it is possible to provide a window cover film having excellent display quality, high optical properties, and particularly, a significantly reduced rainbow phenomenon.

In an exemplary embodiment of the present invention, specifically, the functional coating layer may be formed on the hard coating layer.

In an exemplary embodiment of the present invention, a solid content of the functional coating layer may be 0.01 to 200 g/m² with respect to a total area of the polyamideimide-based film. Preferably, the solid content of the functional coating layer may be 20 to 200 g/m² with respect to the total area of the polyamideimide-based film. When the solid content of the functional coating layer is provided in the above-described basis weight, the rainbow phenomenon does not occur in the window cover film while maintaining the functionality, and thus, excellent visibility may be implemented.

In addition, an application thickness is not limited, but may be 1 to 500 μm, and more specifically, 2 to 450 μm.

In an exemplary embodiment of the present invention, specifically, the functional coating layer may be formed by applying a composition for forming a coating layer containing a coating solvent onto a polyamideimide-based film.

The coating solvent is not particularly limited, but may be preferably a polar solvent. For example, the polar solvent may be one or more solvents selected from an ether-based solvent, a ketone-based solvent, an alcohol-based solvent, an amide-based solvent, a sulfoxide-based solvent, and an aromatic hydrocarbon-based solvent. Specifically, the polar solvent may be one or more solvents selected from dimethylacetamide (DMAc), N-methyl-2-pyrrolidone (NMP), dimethylformamide (DMF), dimethyl sulfoxide (DMSO), acetone, diethyl acetate, propylene glycol methyl ether, m-cresol, methanol, ethanol, isopropanol, butanol, 2-methoxyethanol, methyl cellosolve, ethyl cellosolve, methyl ethyl ketone, methyl butyl ketone, methyl isobutyl ketone, methyl phenyl ketone, diethyl ketone, dipropyl ketone, cyclohexanone, hexane, heptane, octane, benzene, toluene, and xylene.

In an exemplary embodiment of the present invention, as a method of forming the functional coating layer by applying the composition for forming a coating layer, one or more methods selected from a spin coating method, a dipping method, a spraying method, a die coating method, a bar coating method, a roll coating method, a meniscus coating method, a flexo printing method, a screen printing method, a bead coating method, an air knife coating method, a reverse roll coating method, a blade coating method, a casting coating method, and a gravure coating method, may be used, but the present invention is not limited thereto.

<Protective Film>

In an exemplary embodiment of the present invention, the protective film may be included to protect a surface of the window cover film during transportation or storage of the window cover film. The protective film may include an adhesive layer that is easily peeled off when being used while preventing detachment of the protective film or occurrence of surface defects caused by movement such as sliding due to an external force during transportation or storage of the window cover film.

An acrylic component, a urethane-based component, or a silicone-based component may be used as an adhesive component of the protective film. It is preferable to use an adhesive component having high-temperature or high-temperature and high-humidity stability and no residue after long-term attachment.

An adhesive force of the protective film to the polyamideimide-based film is preferably 2 to 20 gf/inch and more preferably 3 to 15 gf/inch, but is not limited thereto.

In an exemplary embodiment of the present invention, the polyamideimide-based film may be subjected to laser cutting before the protective film is stacked, and then, the protective film may be stacked, or the polyamideimide-based film may be subjected to laser cutting in a state where the protective film is stacked.

A thickness of the protective film is not limited, but may be 10 to 100 μm.

Commercially available products of the protective film, for example, E-MASK® RB-100S, RB-200S, R-50EP, AW303EB, and AW343EB (Nitto Denko Corporation), and 7111, 7121, 7131, 7332, 7412, 7531, 7532, and 7721 (Toray Industries, Inc.) may be used, but the present invention is not limited thereto.

<Flexible Display Panel>

In an exemplary embodiment of the present invention, a flexible display panel or flexible display device that includes the window cover film according to an exemplary embodiment may be provided.

In this case, the window cover film may be used as the outermost window substrate of the flexible display device. The flexible display device may be various image display devices such as a general liquid crystal display device, an electro-luminescence display device, a plasma display device, and a field emission display device.

In the case of the flexible display device including the window cover film according to the present invention, display quality may be excellent, in particular, a rainbow phenomenon in which iridescent stains occur may be significantly prevented because distortion caused by light is significantly reduced, and visibility may be excellent to minimize the user's eye fatigue.

Hereinafter, the present invention will be described in more detail with reference to Examples and Comparative Examples. However, the following Examples and Comparative Examples are only examples for describing the present invention in more detail, and the present invention is not limited by the Examples and Comparative Examples.

1) Weight Average Molecular Weight

<Weight Average Molecular Weight of Film>

A weight average molecular weight of a film was measured by dissolving the film in a DMAc eluent containing 0.05 M LiBr. A Waters GPC system, a Waters 1515 isocratic HPLC Pump, a Waters 2414 Refractive Index detector were used as GPC, an Olexis, a Polypore, and a mixed D column were connected to each other and used as a column, polymethyl methacrylate (PMMA STD) was used as a standard material, and the analysis was performed at 35° C. and a flow rate of 1 mL/min.

<Weight Average Molecular Weight of Silsesquioxane Resin>

In the measurement of a weight average molecular weight of a silsesquioxane resin, GPC (Waters GPC system, Waters 1515 isocratic HPLC Pump, Waters 2414 Refractive Index detector) was used, four Shodexes KF-801, 802.5, 803, and 805 (Waters Corporation) that were connected to each other in series were used as a GPC column, THF was used as a solvent, and a rate was 1 mL/min.

2) Modulus/Elongation at Break

A modulus and an elongation at break were measured under a condition in which a polyamideimide-based film having a length of 50 mm and a width of 10 mm was pulled at 25° C. and 50 mm/min using a UTM 3365 (Instron Corporation) according to ASTM D882. A thickness of the film was measured, and data of a value thereof was input to the device. A unit of the modulus is GPa, and a unit of the elongation at break is %

3) Light Transmittance

For a film having a thickness of 50 μm, a total light transmittance measured in the entire wavelength region of 400 to 700 nm and a single wavelength light transmittance measured at 388 nm were measured according to ASTM D1746 using a spectrophotometer (COH-400, Nippon Denshoku Industries Co., Ltd.) and a UV/Vis (UV3600, Shimadzu Corporation), respectively. A unit of the light transmittance is %.

4) Haze

A haze of a film having a thickness of 50 μm was measured according to ASTM D1003 using the spectrophotometer (COH-400, Nippon Denshoku Industries Co., Ltd.). A unit of the haze is %.

5) Yellow Index (YI) and b* Value

A yellow index and a value of a film having a thickness of 50 μm were measured according to ASTM E313 using a colorimeter (ColorQuest XE, Hunter Associates Laboratory, Inc.).

6) Reflectivity

A reflectivity of a film itself having a size of 5 cm×5 cm was measured 5 times using a spectral colorimeter (CM-5, manufactured by Konica Minolta, Inc.) according to ASTM E1164, and an average value was used as the reflectivity.

7) Pencil Hardness 20 mm of a line was drawn on a film produced in each of Examples and Comparative Examples at a load of 750 g and a rate of 50 mm/sec according to JIS K5400, and the drawing of the line was repeated 5 times or more, to measure a pencil hardness when scratches were generated one or fewer times.

8) Rainbow Mura

One surface of a film was blackened, and then, whether a rainbow was generated or not was observed with the naked eye under a three-wavelength lamp in a dark room.

Good (o): No rainbow was observed, and colors were uniformly observed.

Bad (x): A rainbow was distinctly observed, and colors were intensely observed.

[Preparation Example 1] Composition for Forming Hard Coating Layer 2-(3,4-epoxycyclohexyl)ethyltrimethoxysilane (ECTMS, Tokyo chemical industry Co., Ltd.) and water were mixed with each other in a ratio of 24.64 g:2.70 g (0.1 mol:0.15 mol) to prepare a reaction solution, and the reaction solution was placed into a 250 mL 2-neck flask. 0.1 mL of tetramethylammonium hydroxide (Aldrich Corporation) as a catalyst and 100 mL of tetrahydrofuran (Aldrich Corporation) were added to the mixture and stirring was performed at 25° C. for 36 hours. Thereafter, layer separation was performed, a product layer was extracted with methylene chloride (Aldrich Corporation), water was removed from the extract with magnesium sulfate (Aldrich Corporation), and the solvent was vacuum-dried, thereby obtaining an epoxy siloxane-based resin. A weight average molecular weight of the epoxy siloxane-based resin was measured using gel permeation chromatography (GPC), and the measured weight average molecular weight was 2,500 g/mol. A composition was prepared by mixing 30 g of the prepared epoxy siloxane-based resin, 10 g of (3',4'-epoxycyclohexyl)methyl 3,4-epoxycyclohexanecarboxylate and 5 g of bis[(3,4-epoxycyclohexyl)methyl]adipate as a cross-linking agent, 0.5 g of (4-methylphenyl)[4-(2-methylpropyl)phenyl]iodoniumhexafluorophosphate as a photoinitiator, and 54.5 g of methyl ethyl ketone with each other.

[Preparation Example 2] Composition for Forming Hard Coating Layer

A composition was prepared by mixing 20 g of urethane acrylate (UA-P20, Kyoeisha Chemical Co., Ltd.) as an oligomer, g of pentaerythritol triacrylate (M340, Miwon Specialty Chemical Co., Ltd.) as a monomer, 3 g of 1-hydroxycyclohexylphenylketone as a photoinitiator, and 67 g of methyl ethyl ketone with each other.

[Preparation Example 3] Composition for Forming Low-Refractive Layer

A composition was prepared by mixing 5 g of hollow silica (60 nm, solid content: 20%, refractive index: 1.3), 1 g of pentaerythritol triacrylate (M340, Miwon Specialty Chemical Co., Ltd.) as a monomer, 0.2 g of 1-hydroxycyclohexylphenylketone as a photoinitiator, and 93.8 g of isopropyl alcohol (Samchun Pure Chemical Co., Ltd.) with each other.

[Preparation Example 4] Composition for Forming Low-Refractive Layer

A composition was prepared by mixing 3 g of silicone acrylate (SIU2400, Miwon Specialty Chemical Co., Ltd.), 1 g of pentaerythritol triacrylate (M340, Miwon Specialty Chemical Co., Ltd.) as a monomer, 0.2 g of 1-hydroxycyclohexylphenylketone as a photoinitiator, and 95.8 g of methyl ethyl ketone (Samchun Pure Chemical Co., Ltd.) with each other.

[Production Example 5] Production of Base Layer

Terephthaloyl dichloride (TPC) and 2,2'-bis(trifluoromethyl)-benzidine (TFMB) were added to a solution in which dichloromethane and pyridine were mixed with each other in a reactor and stirring was performed under a nitrogen atmosphere at 25° C. for 2 hours. In this case, a molar ratio of TPC:TFMB was set to 300:400, and a solid content was adjusted to 15 wt %. Thereafter, the reactant was precipitated in an excess amount of methanol and then filtered, and the obtained solid content was vacuum-dried at 50° C. for 4 hours or longer to obtain an oligomer. A formula weight (FW) of the produced oligomer was 1,720 g/mol.

N,N-dimethylacetamide (DMAc) as a solvent, 100 moles of the oligomer, and 28.6 moles of 2,2'-bis(trifluoromethyl)-benzidine (TFMB) were injected into the reactor and stirring was sufficiently performed. After confirming that the solid raw material was completely dissolved, fumed silica (surface area: 95 m²/g, <1 μm) was added to DMAc in an amount of 1,000 ppm with respect to the solid content, and the fumed silica was dispersed using ultrasonic waves and then injected into the reactor. 64.3 moles of cyclobutanetetracarboxylic dianhydride (CBDA) and 64.3 moles of 4,4'-hexafluoroisopropylidene diphthalic anhydride (6FDA) were sequentially injected, stirring was sufficiently performed, and then polymerization was performed at 40° C. for 10 hours. At this time, the solid content was 15 wt %. Subsequently, pyridine and acetic anhydride were sequentially added to the solution, respectively, at 2.5-fold moles relative to a total content of the dianhydride, and stirring was performed at 60° C. for 12 hours.

After the polymerization was finished, the polymerization solution was precipitated in an excess amount of methanol and filtered, and the obtained solid content was vacuum-dried at 50° C. for 6 hours or longer, thereby obtaining a polyamideimide powder. The powder was diluted and dissolved with DMAc to 20% to prepare a composition for forming a base layer.

The composition for forming a base layer was coated onto a polyethylene terephthalate (PET) base film, drying was performed at 70° C. for 20 minutes and 120° C. for 1 hour, and cooling was performed at room temperature, thereby producing a film. Thereafter, the film was subjected to a stepwise heat treatment at 100 to 200° C. and 250 to 300° C. for 3 hours and a heating rate of 20° C./min. A residual solvent content in the produced film was 12 wt %. Subsequently, the dried film was separated and fixed to a pin tenter, drying was performed in a drying region at 260° C. for 2 hours, and a heat treatment was additionally performed at 350° C. using an IR-heater for 30 minutes, thereby producing a film having a residual solvent content of 0.2 wt %.

In the produced polyamideimide-based film, a thickness was 50 μm, a transmittance measured at 388 nm was 72%, a total light transmittance was 90%, a haze was 0.3, a yellow index (YI) was 1.5, a b* value was 1.0, a modulus was 7 GPa, an elongation at break was 22%, a weight average molecular weight was 312,000 g/mol, a polydispersity index (PDI) was 2.2, and a pencil hardness was H/750 g. In addition, a refractive index was 1.632.

Example 1

The composition for forming a hard coating layer prepared in Preparation Example 1 was applied onto one surface of the polyamideimide-based film having a thickness of 50 μm produced in Production Example 5 using a meyer bar, curing was performed at 60° C. for 5 minutes, irradiation was performed with UV at 1 J/cm² using a high-pressure metal lamp, and thermal curing was performed at 120° C. for 15 minutes, thereby forming a hard coating layer having a thickness of 5 μm.

The composition for forming a low-refractive layer prepared in Preparation Example 3 was applied onto the other surface of the polyamideimide-based film on which the hard coating layer was formed using a meyer bar, drying was performed at 60° C. for 5 minutes, and irradiation was performed with UV at 1 J/cm² using a high-pressure metal lamp, thereby forming a low-refractive layer having a thickness of 150 nm. The physical properties of the produced window cover film were measured. The results are shown in Table 1.

Example 2

A window cover film was produced in the same manner as that of Example 1 except that the composition for forming a hard coating layer prepared in Preparation Example 2 was used instead of the composition prepared in Preparation Example 1. The physical properties of the produced window cover film were measured. The results are shown in Table 1.

Comparative Example 1

A window cover film was produced in the same manner as that of Example 1 except that the composition for forming a low-refractive layer prepared in Preparation Example 4 was used instead of the composition prepared in Preparation Example 3. The physical properties of the produced window cover film were measured. The results are shown in Table 1.

Comparative Example 2

A window cover film was produced in the same manner as that of Example 1 except that the low-refractive layer was not formed after the hard coating layer was formed. The physical properties of the produced window cover film were measured. The results are shown in Table 1.

TABLE 1

|  | Example 1 | Example 2 | Comparative Example 1 | Comparative Example 2 |
|---|---|---|---|---|
| Refractive index of hard coating layer | 1.50 | 1.52 | 1.52 | 1.52 |
| Refractive index of base layer | 1.632 | 1.632 | 1.632 | 1.632 |
| Refractive index of low-refractive layer | 1.32 | 1.32 | 1.47 | — |
| $\Delta n_1$ | 0.312 | 0.312 | 0.162 | 0.312 |
| $\Delta n_2$ | 0.132 | 0.112 | 0.112 | — |
| Total light transmittance (%) | 94.2 | 93.9 | 90.5 | 88.9 |
| Reflectivity (%) | 5.1 | 5.4 | 8 | 11 |
| b* | 0.2 | 0.25 | 0.8 | 1.5 |
| Rainbow mura | Good | Good | Bad | Bad |

As set forth above, the window cover film according to an exemplary embodiment of the present invention may have a specific structure in which the polyamideimide-based base layer, the hard coating layer, and the low-refractive layer each having a predetermined refractive index are stacked, such that the transmittance may be high, the high resolution may be implemented because the reflectivity is low, and the anti-reflection function may be imparted.

Further, since the window cover film has a low yellow index, is transparent, and has no optical defects such as an interference fringe and a rainbow mura, the window cover film may have more excellent visibility.

Further, even in a case where deformation occurs repeatedly, it is possible to implement an excellent restoring force in which the hard coating layer and the window cover film are restored to the original form without substantially semi-permanent deformation and/or damage. Therefore, a window cover film applicable to a display or foldable device that has a curved shape may be provided.

Further, the durability and long-term lifespan of the flexible display device may be secured.

Further, physical and chemical stability may be secured even under a high-temperature and high-humidity condition.

Further, the window cover film according to an exemplary embodiment of the present invention may have excellent antifouling property and abrasion resistance unlike in the related art.

The window cover film of the present invention may have further improved flexibility and mechanical strength by binding between the polyamideimide-based base layer and the hard coating layer.

Hereinabove, although the present invention has been described by specific matters, exemplary embodiments, and drawings, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to these exemplary embodiments, but the claims and all modifications equal or equivalent to the claims are intended to fall within the spirit of the present invention.

What is claimed is:

1. A window cover film comprising: a hard coating layer, a base layer, and a low-refractive layer that are sequentially stacked, the base layer being formed of a polyamideimide-based resin,
   wherein the low-refractive layer includes silica particles and (meth)acrylate based polymer,
   a refractive index of the low-refractive layer is less than 1.4,
   the refractive index of the base layer is 1.6 to 1.65,
   a refractive index relationship satisfies the following Expression 1, Refractive index of base layer>refractive index of hard coating layer>refractive index of low-refractive layer, [Expression 1]

a refractive index difference $\Delta n2$ between the base layer and the hard coating layer satisfies the following Expression 3, $0.1 \leq \Delta n2 \leq 0.15$, and [Expression 3]

the window cover film has a total light transmittance of 92% or more when measured at 400 to 700 nm according to ASTM D1746.

2. The window cover film of claim 1, wherein a refractive index difference $\Delta n_1$ between the base layer and the low-refractive layer satisfies the following Expression 2, $0.15 \leq \Delta n_1 \leq 0.4$. [Expression 2]

3. The window cover film of claim 1, wherein the refractive index of the base layer is 1.4 to 1.8.

4. The window cover film of claim 1, wherein a thickness of the low-refractive layer is 600 nm or less.

5. The window cover film of claim 1, wherein the window cover film has a reflectivity of 7% or less when measured according to ASTM E1164.

6. The window cover film of claim 1, further comprising one or more functional coating layers selected from an antistatic layer, an anti-fingerprint layer, an anti-fouling layer, an anti-scratch layer, an anti-reflective layer, and an impact absorption layer, the functional coating layer being formed on the hard coating layer.

7. The window cover film of claim 6, further comprising a protective film formed on the functional coating layer.

8. The window cover film of claim 1, wherein the hard coating layer is formed of a silsesquioxane-based compound or a (meth)acrylate-based compound.

9. The window cover film of claim 1, wherein the silica particles are hollow or porous silica particles.

10. The window cover film of claim 1, wherein the base layer has a modulus of 3 GPa or more when measured according to ASTM D882, an elongation at break of 8% or more when measured according to ASTM D882, a light transmittance of 5% or more when measured at 388 nm according to ASTM D1746, a haze of 2.0% or less, a yellow index of 5.0 or less, and a b* value of 2.0 or less.

11. The window cover film of claim 1, wherein the base layer is formed of a polyamideimide (PAI)-based resin having a fluorine atom and an aliphatic cyclic structure.

12. The window cover film of claim 1, wherein the base layer is formed of a polyamideimide (PAI)-based resin having a unit derived from a fluorine-based aromatic diamine, a unit derived from an aromatic dianhydride, a unit derived from an alicyclic dianhydride, and a unit derived from an aromatic diacid dichloride.

13. The window cover film of claim 1, wherein a thickness of the base layer is 10 to 500 μm, and a thickness of the hard coating layer is 1 to 80 μm.

14. The window cover film of claim 1, wherein a pencil hardness of the hard coating layer is 2 H or higher and a water contact angle of the hard coating layer is 80° or more.

15. A flexible display panel comprising the window cover film of claim 1.

* * * * *